United States Patent
Molnar et al.

(10) Patent No.: US 7,328,774 B2
(45) Date of Patent: Feb. 12, 2008

(54) LIFT DRIVE DEVICE

(75) Inventors: Gordon Molnar, Toronto (CA); Peter Shaw, Richmond Hill (CA)

(73) Assignee: Rutherford Independence Limited, Concord, Ontario (CA)

( * ) Notice: Subject to any disclaimer, the term of this patent is extended or adjusted under 35 U.S.C. 154(b) by 0 days.

(21) Appl. No.: 10/822,547

(22) Filed: Apr. 12, 2004

(65) Prior Publication Data

US 2005/0056493 A1  Mar. 17, 2005

(51) Int. Cl.
*B66B 9/02* (2006.01)
*F16H 1/16* (2006.01)
*F16H 1/20* (2006.01)

(52) U.S. Cl. .......................... 187/271; 187/270; 74/425

(58) Field of Classification Search ................. 187/267, 187/270, 271, 200, 201, 202, 268; 74/425, 74/421 A, 424.5, 424.7
See application file for complete search history.

(56) References Cited

U.S. PATENT DOCUMENTS

| 531,625 | A | * | 1/1895 | Dennis ........................ 187/271 |
| 647,491 | A | * | 4/1900 | Hoffmann ................... 74/424.7 |
| 1,113,744 | A | * | 10/1914 | Bjorkstrom ................. 187/271 |
| 1,392,078 | A | * | 9/1921 | Ouillett ....................... 187/271 |
| 4,043,427 | A | | 8/1977 | Ackerman ................... 187/12 |
| 4,051,923 | A | * | 10/1977 | Blanchette et al. ......... 187/271 |
| 5,230,405 | A | | 7/1993 | Bartelt ........................ 187/12 |
| 5,533,594 | A | | 7/1996 | Tremblay et al. ........... 187/201 |
| 5,803,437 | A | * | 9/1998 | Paterson et al. ............ 254/343 |
| 6,023,991 | A | * | 2/2000 | Yabe et al. ................. 74/89.44 |
| 6,616,567 | B2 | * | 9/2003 | Strong et al. ............... 475/331 |
| 6,755,283 | B2 | * | 6/2004 | Lin ............................. 187/270 |

FOREIGN PATENT DOCUMENTS

| CA | 2201046 | 6/1998 |
| CA | 2340172 | 9/2001 |
| CA | 2158614 | 1/2003 |
| CA | 2369668 | 7/2003 |
| CA | 2417506 | 7/2003 |
| DE | 29 46 780 A1 | 6/1981 |
| DE | 32 21 415 A1 | 12/1983 |
| DE | 3504854 A1 * | 8/1986 |
| EP | 1 197 465 A1 | 4/2002 |
| EP | 1 035 064 B1 | 7/2004 |
| EP | 1 125 882 B1 | 11/2004 |

* cited by examiner

*Primary Examiner*—Peter M. Cuomo
*Assistant Examiner*—Eric E. Pico
(74) *Attorney, Agent, or Firm*—Vidas, Arrett & Steinkraus, P.A.

(57) ABSTRACT

A lift drive comprising: a spiral drive element having an axis of rotation, a rack having teeth sized and shaped to be engaged by the spiral drive element, the rack having a longitudinal axis parallel to the axis of rotation, and a motor to rotate the spiral drive element, wherein upon the spiral drive element-rotating, one of the spiral drive element and the rack moves relative to the other along the longitudinal axis.

17 Claims, 6 Drawing Sheets

LIFT DRIVE DEVICE

FIELD OF THE INVENTION

This invention relates generally to the field of drive devices of the sort that are used to move goods or people short distances from one place to another. Most particularly this invention relates to drive devices of the sort that may be used in stair lifts or elevators for use by mobility challenged people.

BACKGROUND OF THE INVENTION

Currently many developed western economies have aging populations. Improved health care and advanced medical technologies are contributing to longer lives on average. As time passes, more and more people reach an advanced age. With advanced age comes reduced mobility, for example, less ability to get up and down stairs in a family home. A modern trend in managed health care is home care, in which individuals are encouraged to live at home rather than in an institution. Home care generally includes a higher quality of life and can be less expensive. Therefore, there is a growing need for devices to enhance the mobility of seniors and other mobility challenged individuals who wish to remain in their homes, but have difficulty using stairs or the like.

To meet the needs of such persons, motorized devices to lift and lower a person up or down stairways have become more popular. In some configurations, the person sits on a seat which rides on a rail. A motor is used to drive the device up and down the rail. The rail is typically made from metal and the drive mechanism is usually a toothed wheel which engages a rack located in the rail. The motor drives the toothed wheel which then rotates and advances the seat along the rail. In some cases the seat is replaced with a platform, onto which a wheelchair may be driven. Thus, rather than sitting on the seat, the person remains in their wheelchair as the platform is lifted or lowered and then the wheelchair simply rolls off the platform at the end of the journey.

These type of devices have met with significant success, but suffer from a number of drawbacks. As can be appreciated, these devices, among other things tend to permit a mobility challenged person to remain in their own home, even though they may no longer be able to climb the stairs between the upstairs and the downstairs. Thus, there is a class of such devices that are specifically designed to be retrofit into existing structures by being placed, for example on an existing stairway. The racks and rails are typically made from metal, to provide sufficient strength for the rack and pinion style gear drive. Such metal components are heavy and somewhat expensive. Thus, it can be both costly and awkward to ship the material to where it is needed. Its weight also makes it awkward and difficult to install. Further, the drive gear, which is typically part of the moving platform is also heavy and expensive. Weight in the drive gear provides a double liability, because not only is the device more expensive to make and ship, every time the lift device is used more energy is required to lift the heavy gear and motor up and down the rail.

Another problem in the prior art devices is that the motors are typically fairly large. This is due to the need to provide enough power to overcome inefficiencies in the drive system as well as enough lift to first, lift the person with a reasonable margin of safety, then, lift the weight of the platform and or seat, as well as the heavy elements of the drive train including both the motor and the drive gear. In this sense there is a negatively reinforcing cycle in which a heavier drive train requires a heavier motor, which in turn requires more lifting power and again a heavier motor. As a result the prior art devices tend to include expensive and heavy components in the drive train, including the motor itself.

SUMMARY OF THE INVENTION

What is desired is an improved drive for use in lift and lower devices, whether seat bearing, platform bearing or even elevator style lifts. Such a drive will be simple and inexpensive to make while at the same time being strong and reliable. Most preferably such a drive will be more efficient than the conventional prior art gear and track drive allowing more of the motor's effort to be directed to lifting and lowering rather than for example overcoming friction. Also such a device will preferably be weather resistant to permit it to be positioned both in indoor and outdoor applications without requiring any significant modifications to suit one application or the other.

Therefore according to a first aspect of the present invention there is provided a lift drive comprising:

a spiral drive element having an axis of rotation;

a rack having teeth sized and shaped to be engaged by said spiral drive element, said rack having a longitudinal axis parallel to said axis of rotation; and a motor to rotate said spiral drive element, wherein upon said spiral drive element rotating, one of said spiral drive element and said rack moves relative to the other along said longitudinal axis.

According to a second aspect of the present invention there is further provided a drive device for lifting loads comprising:

a moveable carriage having wheels;

a motor carried by said carriage, said motor having an output shaft;

a gearbox attached to said output shaft to reduce a speed of revolution transmitted by said motor, such gearbox being configured for maximum efficiency, a threaded spiral drive element attached to and driven by an output shaft of said gearbox; and a fixed track having teeth sized and shaped to be engaged by said threaded spiral drive element, wherein upon said motor being activated said spiral drive element drives said carriage along said track.

BRIEF DESCRIPTION OF THE DRAWINGS

Reference will now be made, by way of example only and without limiting the broad scope of the invention as defined in the appended claims, to drawings which depict preferred embodiments of the present invention and in which:

DETAILED DESCRIPTION OF THE PREFERRED EMBODIMENTS

Figure 1:
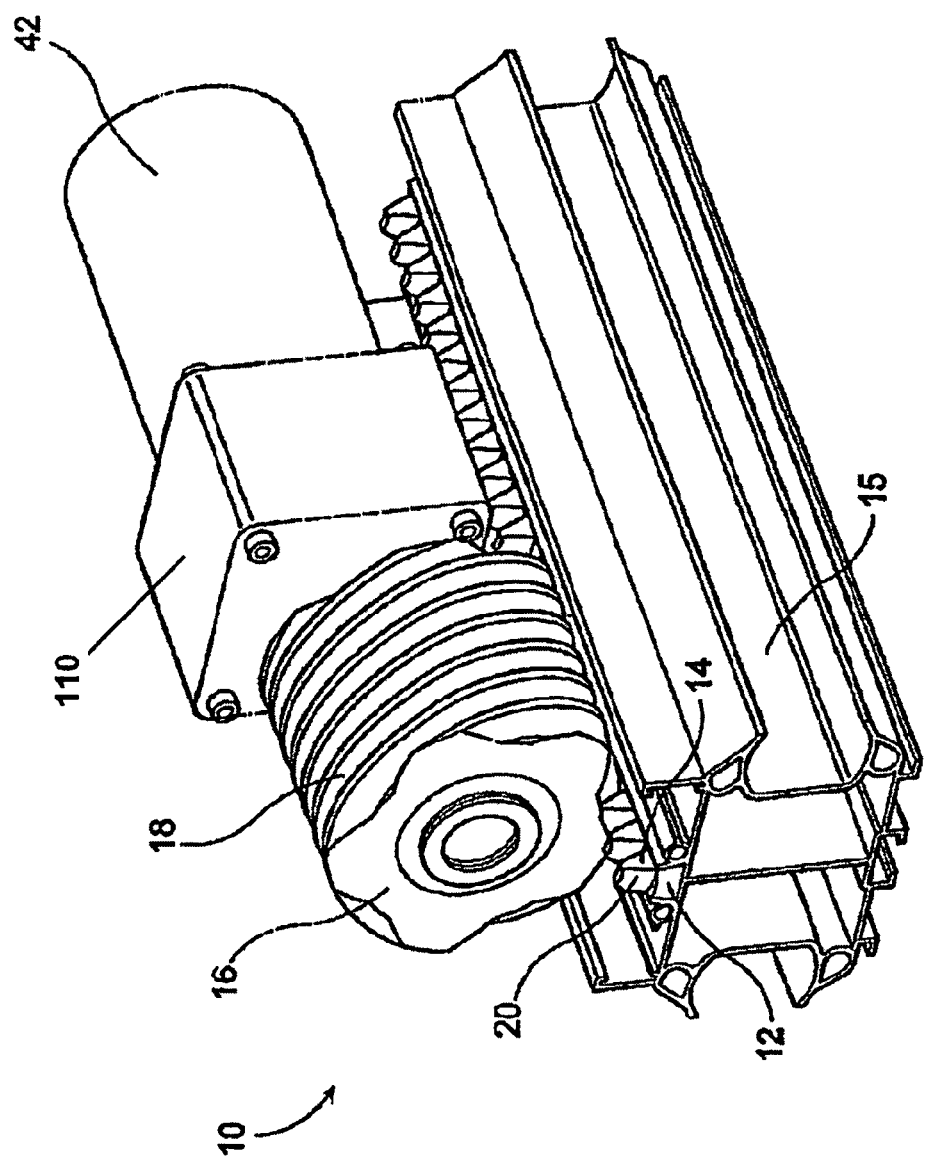
FIG. 1 is a view of a drive train according to the present invention.

FIG. 1 shows a lift drive device 10 according to the present invention. The lift drive device 10 includes three main elements, namely a track 12 having teeth 14, incorporated into a rail 15, a drive element 16 having spiral drive threads 18 and a motor 42. In this sense the row of teeth form a track, and the track of teeth form part of the rail and are integrated therewith. Motor 42 has an output shaft which is attached to gearbox 110. In the present specification the term lift drive is used, although the drive of the present invention can both lift and lower. The drive of the present invention is most suitable for lifting along an inclined plane, although vertical lifts are also comprehended. As explained in more detail below, by reversing the direction of rotation of the drive element, the present invention can be used to move in both directions along a rail 15 having a track 12.

Figure 2:
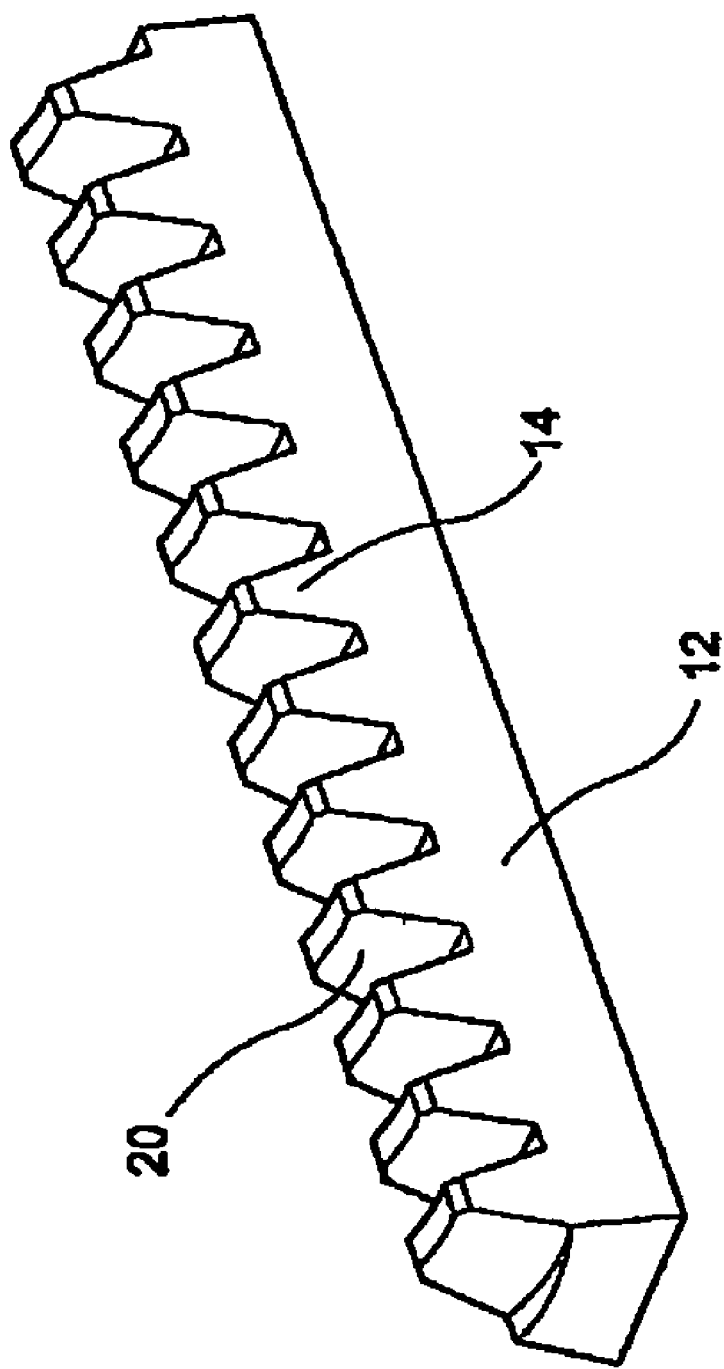
FIG. 2 is a close up view of a track according to the present invention.
Figure 3:
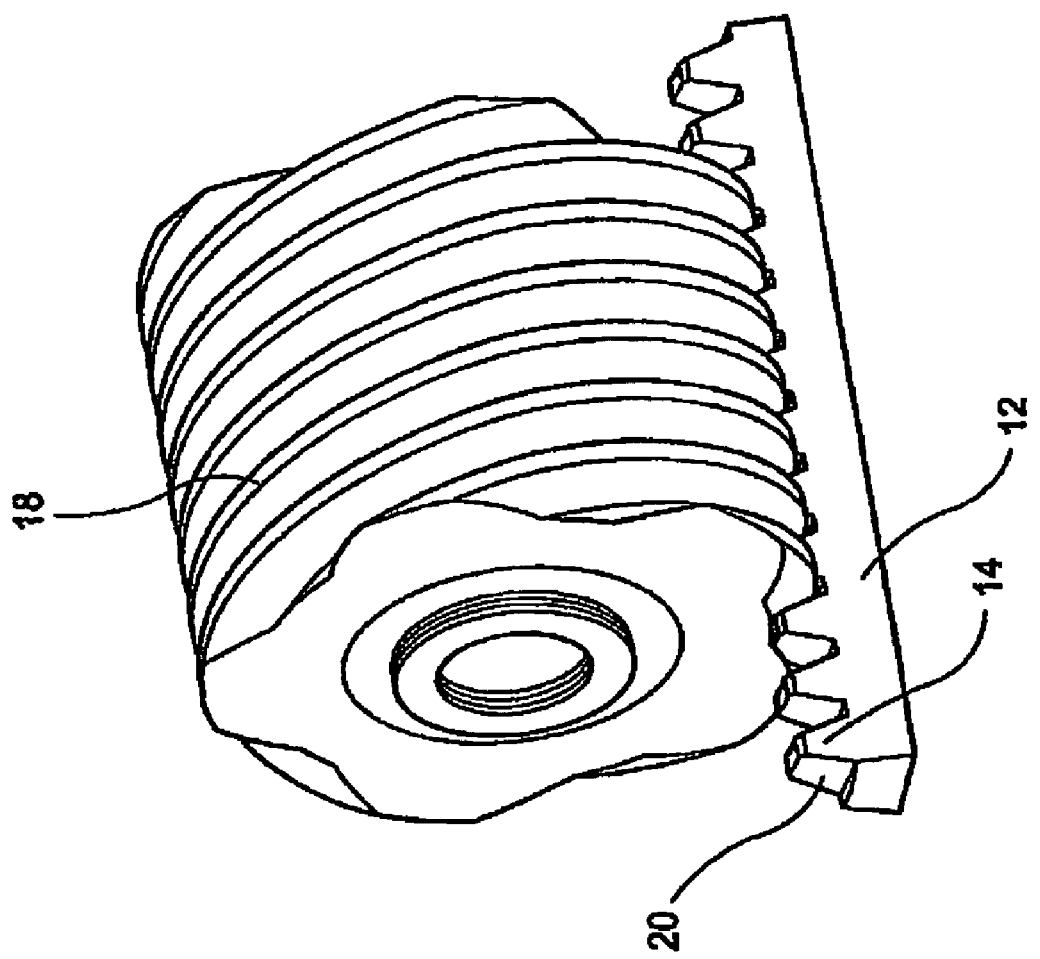
FIG. 3 is a side view of the drive element engaging the track of FIG. 2 according to the present invention.

FIG. 2 shows the teeth 14 of the track 12 in greater detail. Most preferably the teeth are integrally formed with the track and are made from a moulded plastic. Many forms of plastic can be used, but high strength plastics are preferred. Suitable plastics include structural nylon, oil impregnated nylon, wax impregnated plastic NYLUBE, NYLATRON and many other plastic formulations. The plastic must have the mechanical properties to withstand the forces generated during the lifting of the load by the drive device. As explained in more detail below, the configuration of the present invention reduces the point loading of components inherent in the prior art devices, greatly lowering the stresses in individual components and permitting lightweight plastics to be used.

According to the present invention the most preferred form of the track is to be integrally moulded with the rail, but the present invention also comprehends separate track and rail elements which are then joined together. In some cases, for example, it may be preferred to have the teeth 14 formed separately, so individual teeth can be replaced in the event they become worn or the like over time. However, for ease of manufacturing it is believed that the most efficient way to implement the present invention is to integrally mould the teeth in a track which is then slid into a slot in a rail. The rail is most preferably extruded as described in more detail below.

Each tooth 14 of the track 12 includes a thrust or bearing surface 20. The bearing surface 20 engages the spiral drive thread of the drive element. To ensure an even distribution of load, the tooth is angled to generally match the angle of the spiral thread, as it makes contact with the tooth. Thus, the load is most preferably distributed over the contact area of the thrust or bearing surface. As will be appreciated, this area can be made larger or smaller, within certain limits, according to the load bearing design of the tooth.

Each tooth is designed to support the thrust generated on the tooth by the spiral drive threads. To this end the tooth is generally tapered towards the top and includes a relatively thicker base, to increase the strength of the tooth against shear forces. The individual teeth are aligned, in the rack along a longitudinal axis, and each tooth includes a thrust surface which is angled relative to the longitudinal axis. The angle of the thrust surface is intended to match exactly the angle of the spiral drive thread, so that the drive thread rests against the full bearing surface. In this way the load exerted by the drive thread on the tooth is spread out over the whole bearing surface reducing point loading in both the spiral thread and the tooth. The area of the bearing surface is made large enough, according to the present invention, that the force exerted by the drive thread is well below the yield strength of the plastic used in the tooth or the thread. In this way a reliable and strong tooth design can be developed. As will be appreciated by those skilled in the art, the larger the bearing force on the tooth, the larger the bearing surface must be to operate within safe design limits.

The drive element includes drive threads which are in the form of spirals. Thus as the drive element of the present invention is rotated, the spiral thread advances or retreats along the track and rail. If the thread is resting on the bearing surface of a tooth, then, by reason of the spiral rotating and the tooth being fixed, the drive element is driven along the track. Thus, in its broadest aspect the present invention translates the rotational motion of the spiral drive element into linear movement along the toothed track.

An important feature of the present invention is the distribution of load among a number of spiral threads and teeth to reduce the stresses on any individual tooth or spiral. The pressure, on any component in the drive train is a function of the load, divided by the area. Thus, to reduce the pressure on the individual components, such as the teeth and the drive threads, requires increasing the load bearing area. The present invention provides design features which are used to increase the load bearing area.

According to the present invention, one or more spiral threads can contact more than one tooth. Thus, if the spiral contacts two teeth, at the same time, as opposed to one tooth, the total load is the same, but the load carried by each tooth is reduced by one half. According to the present invention it is most preferable that the drive element be elongated so that at least one thread is sized and shaped to engage at least two teeth at the same time, to reduce the stress induced in each tooth. While the present invention comprehends that more than two teeth could be engaged by a single spiral drive thread this would require making the drive element considerably longer, or reducing the pitch of the drive thread. Making the drive element longer is undesirable as being expensive and reducing the pitch is undesirable because this then slows the rate of progress of the drive train along the track for the same rotational speed.

To overcome the problem of reduced pitch that would be required to reduce loads by increasing thrust surface contact area, the present invention provides, in a most preferred configuration, multiple thread starts on the drive element. More specifically, the preferred form of the present invention will have one to twelve thread starts on the drive element, and most preferably about five. In this manner the load is equally distributed over five threads and further, most preferably at least one thread engages two teeth, for six thrust or bearing surfaces to be simultaneously engaged. In this manner rather than advancing along the track one tooth per revolution, as would be the case for a one thread drive element, the preferred device provides for an advance of five teeth per revolution, which provides a reasonable speed for the drive system of the present invention (having regard to the preferred tooth spacing).

As can be appreciated, the prior art device involving a cog or gear drive placed essentially all of the lift force to a single tooth at a time. These devices are typically required to be designed for a load of about 350 pounds, with a factor of safety. This requires a form of steel or other high strength metal teeth as well as cog or gear. In contrast, the present invention permits the load to be distributed over, for example six teeth, permitting a material having one sixth the strength to be used. Put another way, the track tooth of the present invention needs to be designed to withstand only a design load of 50 pounds with a reasonable factor of safety such as 1.5 or 2, not 350 pounds as in the prior art.

As an example of one configuration of drive element according to the present invention, reasonable results have been achieved with the following. A preferred tooth spacing is about 0.5 inches. Thus, if there was only one drive thread, the speed of the device would be one tooth or about 0.5 inches per revolution. However, since in the preferred design there are five threads, the design speed is about 2.5 inches per revolution. A typical motor output speed is 120 rpm, meaning that for a design speed of about 25 feet per minute, a reasonable gear ratio can be used in the gearbox as discussed in more detail below. The present invention provides that the spacing of the teeth and the number of starts can be varied to provide a predetermined design speed for the drive device along the track. An important aspect of this invention is to vary the number of starts to achieve a predetermined desired linear speed at reasonable gear ratios.

An additional advantage of a drive train of the present invention can now be appreciated. One concern of these type of devices is a failure of the drive mechanism, which could lead to uncontrolled descent for example. The present invention provides multiple contact between the spiral threads and the teeth. In the example above there are provided six thrust surface contact areas. Thus, in the unlikely event that any individual tooth failed, five teeth will remain to share the remaining load. Further even if a tooth did fail, the drive element has to only travel an additional short distance along the track, before six teeth are again engaged. In this manner the present invention provides a form of failsafe drive that will be able to avoid a break away or free fall conditions from being established between the spiral drive element and the rack.

Figure 4:
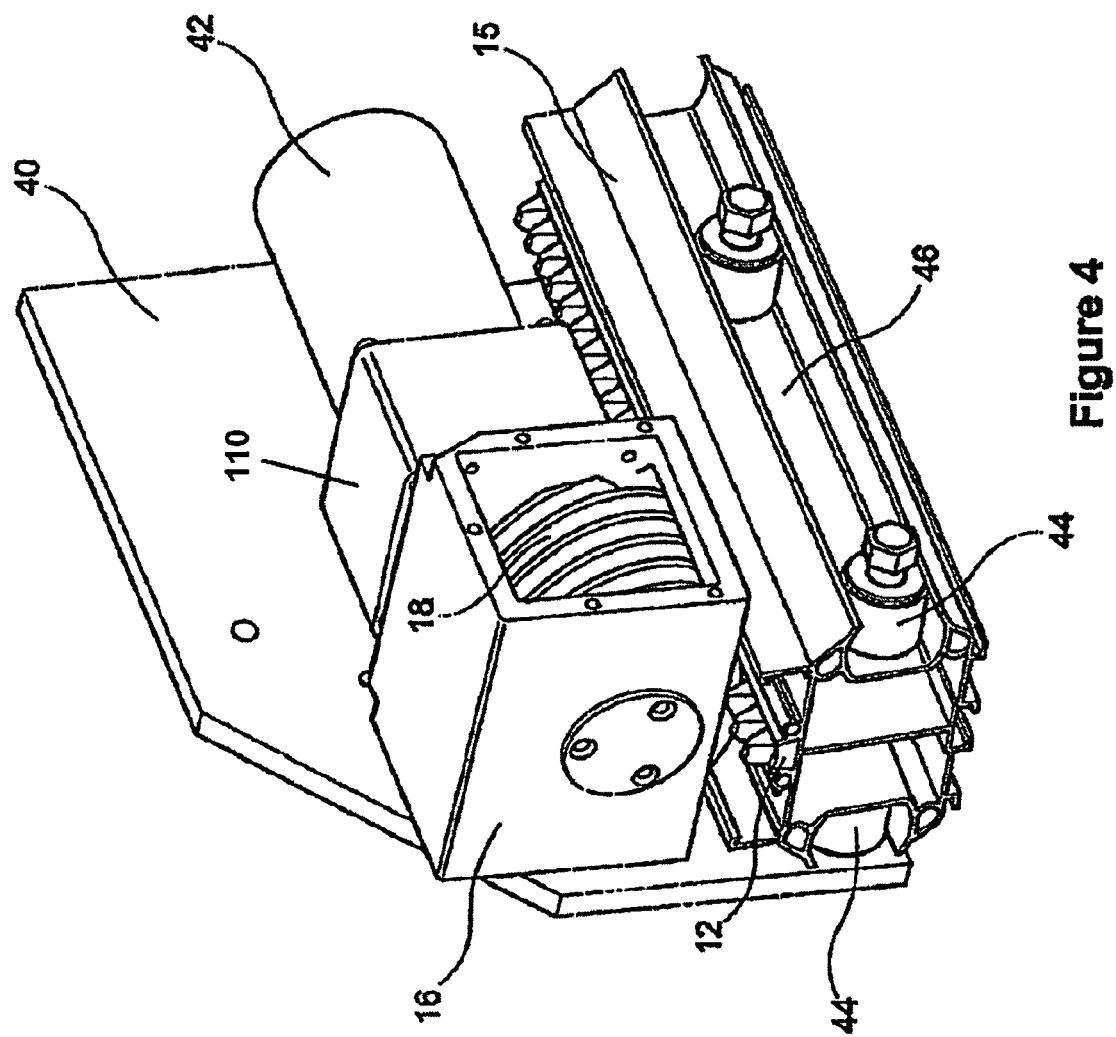
FIG. 4 is a view of a more complete assembly incorporating a drive train of the present invention.

FIG. 4 shows one implementation of the present invention is a stair lift device. As noted the present invention is not limited to this application and may be used in many forms of lift devices including elevators having vertical lift and lower cycles. In figure 4 there is shown a carriage 40 onto which the motor 42 and drive element are placed. The carriage 40 preferable includes wheels 44 which run along wheel guides 46 formed in the rail 15. Motor 42 has an output shaft which is attached to gearbox 110. The wheels provide for a free and easy movement of the carriage along the rail. In most cases at least two wheels are used on each side of the rail, and in some cases more wheels might be used, or the wheels can be separated by a greater distance to provide additional stability to the device. Also shown are the motor and drive element mounted onto the carriage. One concern of the present invention is the possibility that the drive element could lift up and therefore become disengaged from the teeth of the rack. While typically the load being moved will help to prevent this, it is also preferred that the drive element be constrained from so disengaging. In this embodiment the drive element rotates about a fixed axis, and the carriage is sized and shaped to remain engaged with the rail. In other words the wheel guides not only permit the wheels to run freely along the rail, they act to ensure that the carriage remains engaged with the rail, and thereby that the drive element remains engaged with the rack and the teeth thereof.

An advantage of using a plastic material is that a low coefficient of friction is an inherent property many of the these types of materials. Through the use, for example, of oil or wax impregnated plastic, or other very low friction plastics, the frictional losses can be further reduced. The lower the frictional losses, the more efficient the drive train and the less powerful a motor can be used, again taking advantage of a virtuous circle to save weight and improve performance. In a preferred embodiment the track is made from a low cost structural nylon6/6, and the worm is made with spiral threads of NYLATRON or NYLUBE, which are oil and wax impregnated plastics respectively. The combination of these two plastics permits a coefficient of friction of between 0.03 and 0.18 and most preferably substantially between 0.05 and 0.075. This yields an efficiency of about 76 to 86 per cent.

Figure 5:
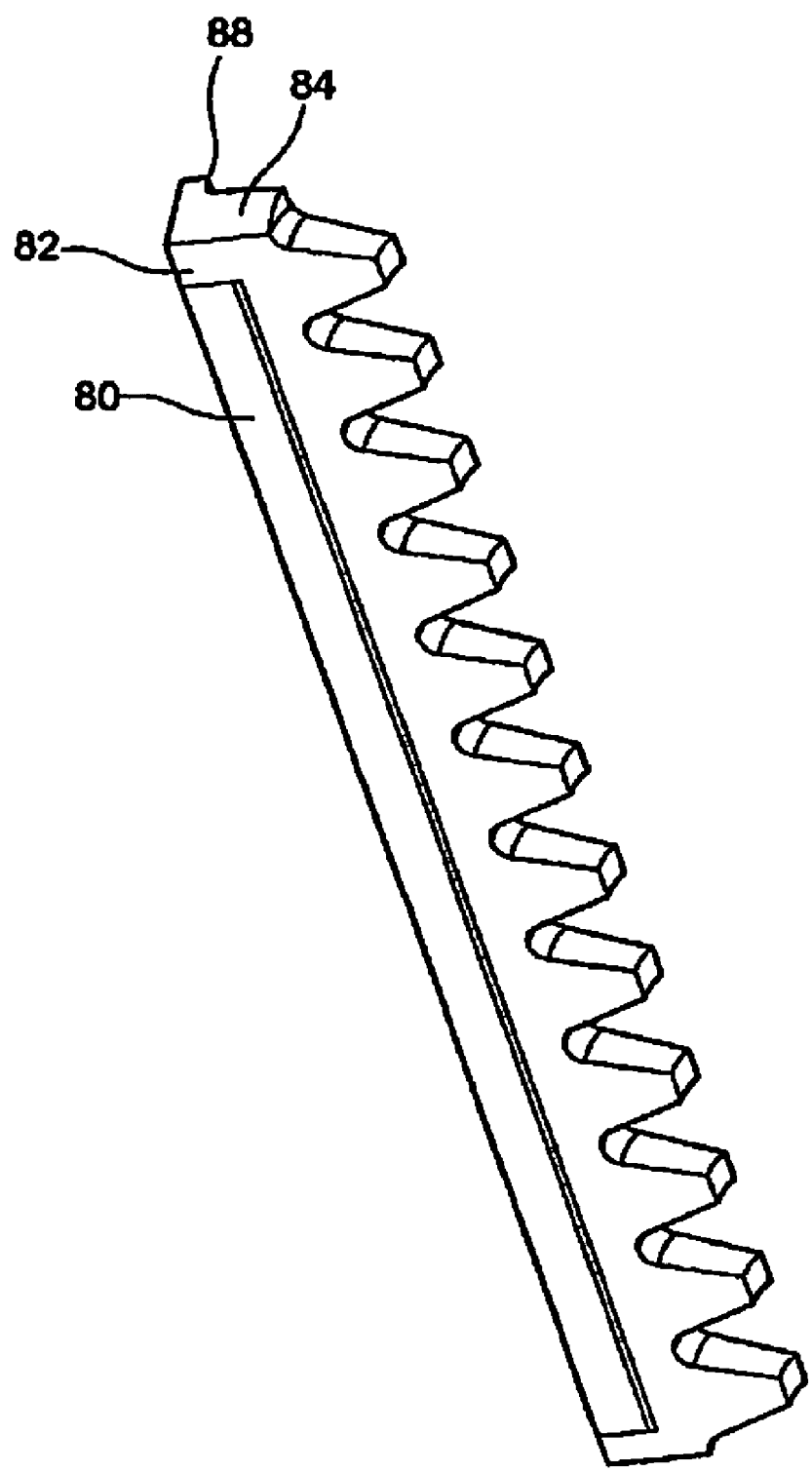
FIG. 5 is a cross sectional view of a section of track according to a preferred embodiment.

A possible disadvantage of using plastic for the load bearing elements of the drive train in the present invention is that such a material can deform under load. If the material deforms too much, the distribution of loads over many teeth as is desired to prevent undue stress in any one tooth is compromised. Therefore the present further comprehends molding the track in the form of short track sections and using a reinforcement in each track section to prevent undue deformation. Referring to FIG. 5, the reinforcing element can take the form of a metal insert 80, which fits into an opening 82 moulded into the track section 84 at the time track section 84 is formed. The reinforcing element can be made from any suitable rigid material and reasonable results have been obtained with steel inserts. Although the reinforcing element could extend the full length of the track section, in the preferred form plastic end sections are provided between adjacent track sections. This permits a certain amount of deformation to occur on the pre-loading of a track formed from a plurality of track sections, which adds to the dimensional stability of the track under load.

Although other forms of reinforced plastic may also be used, the ones having the reinforcement dispersed within the plastic such a fibre reinforced plastic are less preferred. A problem with such materials is that the reinforcing fibres create too much wear on the drive gear.

In one preferred embodiment the track section is formed with a pair of opposed shoulders, one of which is shown at 88, which can fit under a retaining lip in a rail section. Thus, toothed rack sections can be slid into place, from one end of the rail section, until the full length of the rail section has a rack installed thereon.

An additional aspect of the present invention is to be able to utilize a more efficient gearbox. A suitable motor for use in this type of system will typically have motor speed of about 5000 rpm. In the rack and pinion or cog system of the prior art, this required a gear box capable of reducing the speed about 120:1 to about 140:1 to give a cog drive speed of about 20 to 30 rpm. In the present invention due to desired rotational speeds being about 100 to 130 rpm, the gear box reduction is only about 20:1 to 30:1. This means that a smaller, efficient and lighter gear box can be used in the present invention. Such a gearbox, when the output shaft is in line with the motor shaft, will have an efficiency of between 70% to 98% so that when combined with the efficiency of the spiral drive element the total drive train efficiency, excluding the motor itself, is between about 35 and 86 per cent and most preferably about 55 to 84%. This compares favourably to the usual 30 to 40% efficiency of the prior art. Such efficiency permits a smaller lighter motor to be used, saving additional weight and cost in the design.

Another advantage according to the present invention of using plastic elements is that they may be used outside without degrading due to rust or corrosion. Thus a drive train according to the present invention is suitable for use in an outdoor application such as might be associated with an outside front stair of a residence.

It can now be appreciated that the present invention translates rotary motion from an output shaft of a motor into linear motion along a track. A carriage, for example which is supported on rollers or wheels on the track can thus be readily moved along the track by means of the motor. In the most preferred form of the present invention the axis of rotation of the spiral drive element is parallel to the axis of the track, and to the direction of movement along the track. The motor may be located in any convenient orientation to the spiral drive element, as long as the output shaft from the motor drives the spiral drive element. For the greatest efficiency, it is most preferred to connect the motor up directly to the spiral drive element, although other configurations are certainly possible.

Figure 6:
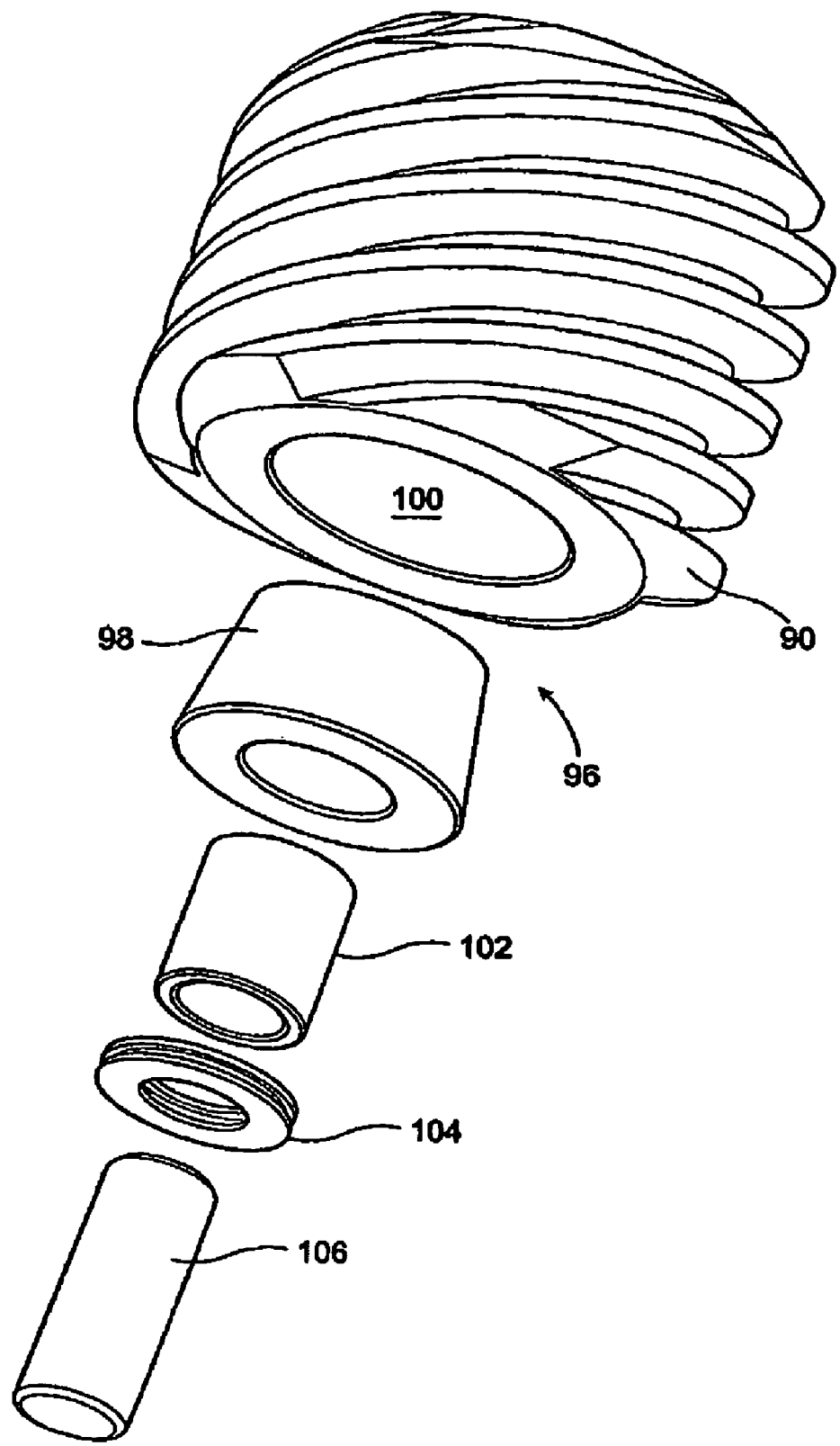
FIG. 6 is a cross sectional view of a drive configuration according to the present invention.

Another aspect of the present invention is a preferred sequence of elements in the drive train for the lifting and lowering of loads, such as people, which includes an efficient yet safe safety braking system. Essentially what is preferred is to insert a cone brake and a one way clutch bearing between the drive shaft of the motor and the helical or worm gear as shown in FIG. 6. In this drawing the worm gear is shown as 90, the motor shaft as 92 and the clutch bearing as 102. The cone brake is shown as 96 which includes a cone 98 and a brake surface 100. The clutch bearing 102, cone and brake surface are all coaxial. A thrust bearing 104 and a fixed clutch shaft 106 complete the assembly.

According to this aspect of the present invention the clutch bearing allows the motor shaft to freely rotate in a load lifting direction. In this case the cone brake is essentially by-passed and the motor effort is directed completely through the clutch bearing into the gear. Thus, the motor is allowed to exert a maximum effort into the lifting of the load and a minimum of effort in overcoming friction. The clutch bearing preferably runs with as little frictional resistance as possible in the lifting direction.

In the load lowering direction however, the clutch bearing will not rotate. Thus, the only way to lower the load is for the motor to overcome the frictional resistance between the cone and the brake surface. These two elements are in the load bearing portion of the assembly, so the greater the load being lowered the greater the axial force and thus the greater the frictional force or the braking force between the cone and the brake surface. Thus, the present invention provides for a safety brake which creates a greater braking resistance in response to a larger load (which in turn requires a greater braking resistance). The cone and braking surface are configured to create enough of a braking force that there will be no uncontrolled descent of the lift device, but not so much braking force that the motor cannot over come the braking force to cause the lifting device to lower due to the influence of the motor.

Another benefit of the present invention can also now be appreciated. Due to the use of light-weight components in the design, the present invention is much easier to ship and manage at the installation site. Thus, the present invention extends the scope of installations of this type of device from custom installations to even do it your self installations, greatly expanding the potential market for such devices. The light weight components render the overall device much more easy to handle and permit the installation to accomplished by a single person. Thus, the use of such components facilitated by the design of the present invention extends the reach of this type of product into many more applications than was previously possible.

It will be appreciated by those skilled in the art that while reference has been made to certain preferred embodiments of the present invention, various modifications and alterations are possible without departing from the broad spirit of the claims which are attached hereto. For example, while the number and pitch of the spiral threads can be varied, what is desired is to have a sufficient number of starts to provide a reasonable speed to the linear motion along the track, while at the same time having a reasonable load on any individual tooth. In this sense reasonable means in an amount sufficient to permit the track and teeth to be formed from a material such as plastic.

The embodiments of the invention in which an exclusive property or privilege is claimed are defined as follows:

1. A lift drive comprising:
   a plastic spiral drive element having an axis of rotation;
   a single plastic rack having a base and a plurality of teeth extending from said base, wherein each tooth has a thrust surface sized and shaped to be engaged by said spiral drive element, said base having a reinforcing element, and said rack having a longitudinal axis parallel to said axis of rotation;
   a motor coupled to said spiral drive element for rotating said spiral drive element;
   a movable carriage having wheels, said motor being mounted onto said carriage,
   wherein said rack is comprised of a plurality of sections, each of said sections comprising a plastic molded body having a base and a plurality of teeth extending from said base, each tooth including a thrust surface sized and shaped to have sliding contact with a thread from a worm gear, said body further including a reinforcing element, and
   wherein said reinforcing element for said section is a metal reinforcing element and provides dimensional stability to said plastic molded body under load, and
   wherein said section is molded with a void and said reinforcing element is sized and shaped to fit into said void, and
   wherein upon said spiral drive element rotating, one of said spiral drive element and said rack moves relative to the other along said longitudinal axis in a lift direction or a lower direction.

2. A lift drive as claimed in claim 1 wherein said spiral drive element moves and said rack is stationary.

3. A lift drive as claimed in claim 1 wherein said spiral drive element includes between one and twelve generally spiral drive threads, each of said drive threads engaging at least one of said rack teeth.

4. A lift drive as claimed in claim 3 wherein at least one of said spiral drive threads engages at least two teeth on said rack at once.

5. A lift drive as claimed in claim 2 wherein said carriage includes a plurality of wheels and said rack is fixed to a rail by said base and wherein said rail includes wheel guides to guide said wheels and thereby said carriage along said rail.

6. A lift device as claimed in claim 2 wherein each of said teeth includes a thrust surface sized and shaped to engage at least one of spiral drive threads of said spiral drive element.

7. A lift device as claimed in claim 1 wherein said rack includes teeth that are spaced apart by a distance "a" and the number of teeth passed per revolution of said spiral drive element is determined by the number of threads on said spiral drive element, wherein the speed of said movement along said longitudinal axis is proportional to the number of spiral drive threads as well as the spacing "a" of said teeth.

8. A lift device as claimed in claim 1 wherein said device further includes a gearbox to operatively couple said motor to said spiral drive element, whereby said spiral drive element is rotated at a speed suitable for producing an acceptable linear speed for said drive element along said track.

9. A lift device as claimed in claim 8 constructed and arranged such that when said motor has a predetermined output speed, and said spiral threads of said spiral drive element have a preselected pitch, and said teeth have a predetermined spacing, said speed of rotation of said drive element and said tooth spacing drive said carriage along said rack at a predetermined speed.

10. A lift device as claimed in claim 1 wherein a coefficient of friction for said spiral drive element and said teeth is between 0.03 and 0.18.

11. A lift device as claimed in claim 1 wherein said spiral drive thread is made from oil impregnated plastic.

12. A lift device as claimed in claim 11 further including a gear box between said motor and said spiral drive element, said gear box providing a speed reduction of between about 8 to 1 and 60 to 1.

13. A lift device as claimed in claim 12 wherein said gear box and spiral drive element have a combined efficiency of between 35% to 88%.

14. A lift device as claimed in claim 13 wherein said spiral drive element and said rack have an efficiency of between 70% and 86%.

15. A drive device for lifting loads comprising:
a moveable carriage having wheels;
a motor carried by said carriage, said motor having an output shaft;
a gearbox attached to said output shaft to reduce a speed of revolution transmitted by said motor, such gearbox being configured for maximum efficiency,
a plastic threaded spiral drive element attached to and driven by an output shaft of said gearbox; and
a single plastic fixed rack having teeth sized and shaped to be engaged by said threaded spiral drive element, said rack being reinforced,
wherein said fixed rack comprised of a plurality of track sections, each of said track sections comprising a plastic molded body having a base and a plurality of teeth extending from said base, each tooth including a thrust surface sized and shaped to having sliding contact with a thread from a worm gear, said body further including a reinforcing element, and
wherein said reinforcing element for said section is a metal reinforcing element and provides dimensional stability to said plastic molded body under load, and
wherein said track section is molded with a void and said reinforcing element is sized and shaped to fit into said void, and
wherein upon said motor being activated said spiral drive element drives said carriage longitudinally along said rack.

16. A drive device as claimed in claim 15 wherein said reinforcing is separated from either end of said track section by a plastic portion, whereby said track section can be axially preloaded.

17. A drive device for lifting loads comprising:
a moveable carriage having wheels;
a motor carried by said carriage, said motor having an output shaft;
a gearbox attached to said output shaft to reduce a speed of revolution transmitted by said motor, such gearbox being configured for maximum efficiency,
a plastic threaded spiral drive element attached to and driven by an output shaft of said gearbox; and
a single plastic fixed rack having teeth sized and shaped to be engaged by said threaded spiral drive element, said rack being reinforced,
wherein said fixed rack is comprised of a plurality of sections, each of said sections comprising a plastic molded body having a base and a plurality of teeth extending from said base, each tooth including a thrust surface sized and shaped to have sliding contact with a thread from a worm gear, said body further including a reinforcing element, and
wherein said base of each of said sections further includes shoulders for retaining said section in a track, and
wherein upon said motor being activated said spiral drive element drives said carriage longitudinally along said rack.

* * * * *